United States Patent [19]
Ishida et al.

[11] Patent Number: 6,155,121
[45] Date of Patent: Dec. 5, 2000

[54] V-BELT NOISE TESTER AND TESTING METHOD

[75] Inventors: Hideo Ishida, Tokyo; Kimio Izawa, Matsumoto, both of Japan

[73] Assignees: Nissan Motor Co., Ltd., Yokohama; Fujigiken Kogyo Co., Ltd., Matsumoto, both of Japan

[21] Appl. No.: 09/206,707

[22] Filed: Dec. 7, 1998

[30] Foreign Application Priority Data

Dec. 11, 1997  [JP]  Japan ................................ 9-341332

[51] Int. Cl.[7] .......................... G01L 5/00; G01M 13/02
[52] U.S. Cl. ............................... 73/862.41; 73/593
[58] Field of Search ........................... 73/593, 660, 162, 73/118.1, 487, 158, 862.41

[56] References Cited

U.S. PATENT DOCUMENTS

| | | | |
|---|---|---|---|
| 4,593,582 | 6/1986 | Sawada et al. | 74/864 |
| 4,928,538 | 5/1990 | Burdess et al. | 73/862.41 |
| 5,698,796 | 12/1997 | Hirano | 73/862.41 |
| 5,728,938 | 3/1998 | Choi et al. | 73/593 |
| 5,932,801 | 3/1998 | Akishita et al. | 73/660 |

FOREIGN PATENT DOCUMENTS

| | | |
|---|---|---|
| 208 332 | 5/1984 | Germany . |
| 6-94514 | 4/1994 | Japan . |
| 8-443187 | 2/1996 | Japan . |

*Primary Examiner*—Daniel S. Larkin
*Assistant Examiner*—Helen C. Kwok
*Attorney, Agent, or Firm*—Foley & Lardner

[57] ABSTRACT

A V-belt is mounted on a first fixed conical plate and second fixed conical plate of a lower unit, and an upper unit is made to descend. A first movable conical plate and second movable conical plate are installed in the upper unit, and the V-belt is gripped between the fixed conical plates and movable conical plates. When a rotary actuator of the lower unit draws a drawbar which extends below the movable conical plate downwards, a predetermined pressure is applied to the V-belt. The first movable conical plate and first fixed conical plate are rotated in this state to drive the V-belt, and a noise test is performed.

5 Claims, 7 Drawing Sheets

V-BELT NOISE TESTER AND TESTING METHOD

FIELD OF THE INVENTION

The present invention relates to a noise test of a V-belt used with a belt type continuously variable transmission.

BACKGROUND OF THE INVENTION

In a belt-type continuously variable transmission (CVT) for a vehicle, a V-belt is looped around two pulleys of variable groove width. A drive ratio is varied by varying this groove width. The V-belt comprises a plurality of V-shaped elements connected via a ring.

The belt type CVT transmits a drive force by the contact frictional force of the V-belt and the pulleys. Therefore, when the pulleys and elements do not come in contact with each other uniformly as a result of the dimensional tolerance of the elements, or when a dynamic balance is not achieved, noise emitted by the V-belt increases. The V-belt is tested using a noise tester as disclosed for example in Tokkai Hei 8-43187 published by the Japanese Patent Office in 1996.

However, in this prior art noise tester, the pulley unit of the belt type CVT is used without modification. To detach the ring-shaped belt, it is therefore necessary to dismantle a bearing, and remove the input axis of the drive pulley and the output axis of the driven pulley from the main body of the tester.

As a result, time is required to detach the belt from the tester and examine a single belt, and total inspection of a plurality of belts is difficult.

SUMMARY OF THE INVENTION

It is therefore an object of this invention to decrease the time required for a noise test of a V-belt.

In order to achieve the above object, this invention provides a noise tester of a V-belt used in a continuously variable transmission, comprising a lower unit, a first fixed conical plate and second fixed conical plate supported free to rotate in the lower unit, an upper unit which displaces in a vertical direction above the lower unit, an actuator for displacing the upper unit in a vertical direction, a first movable conical plate and second movable conical plate which are supported free to rotate in the upper unit via shafts and displace in a vertical direction, a motor for rotating either of the shafts, a sensor for measuring either the vibration of either of the shafts or the noise of the V-belt, and a controller for determining whether or not the V-belt is satisfactory based on the measured vibration or noise.

According to an aspect of this invention, the motor rotates either of the shafts at a rotation speed corresponding to the rotation speed when a vehicle is coasting.

According to another aspect of this invention, the controller determines that the V-belt is satisfactory when the vibration or noise measured by the sensors is less than a predetermined value.

This invention also provides a method of testing noise of a V-belt used in a continuously variable transmission, comprising a step for measuring either the vibration of a shaft which rotates the V-belt or the noise of the V-belt when the V-belt is driven at a rotation speed corresponding to the rotation speed when a vehicle is coasting, and a step for determining whether or not the V-belt is satisfactory based on the measured vibration or noise.

The details as well as other features and advantages of this invention are set fourth in the remainder of the specification and are shown in the accompanying drawings.

DESCRIPTION OF THE PREFERRED EMBODIMENTS

Figure 1:
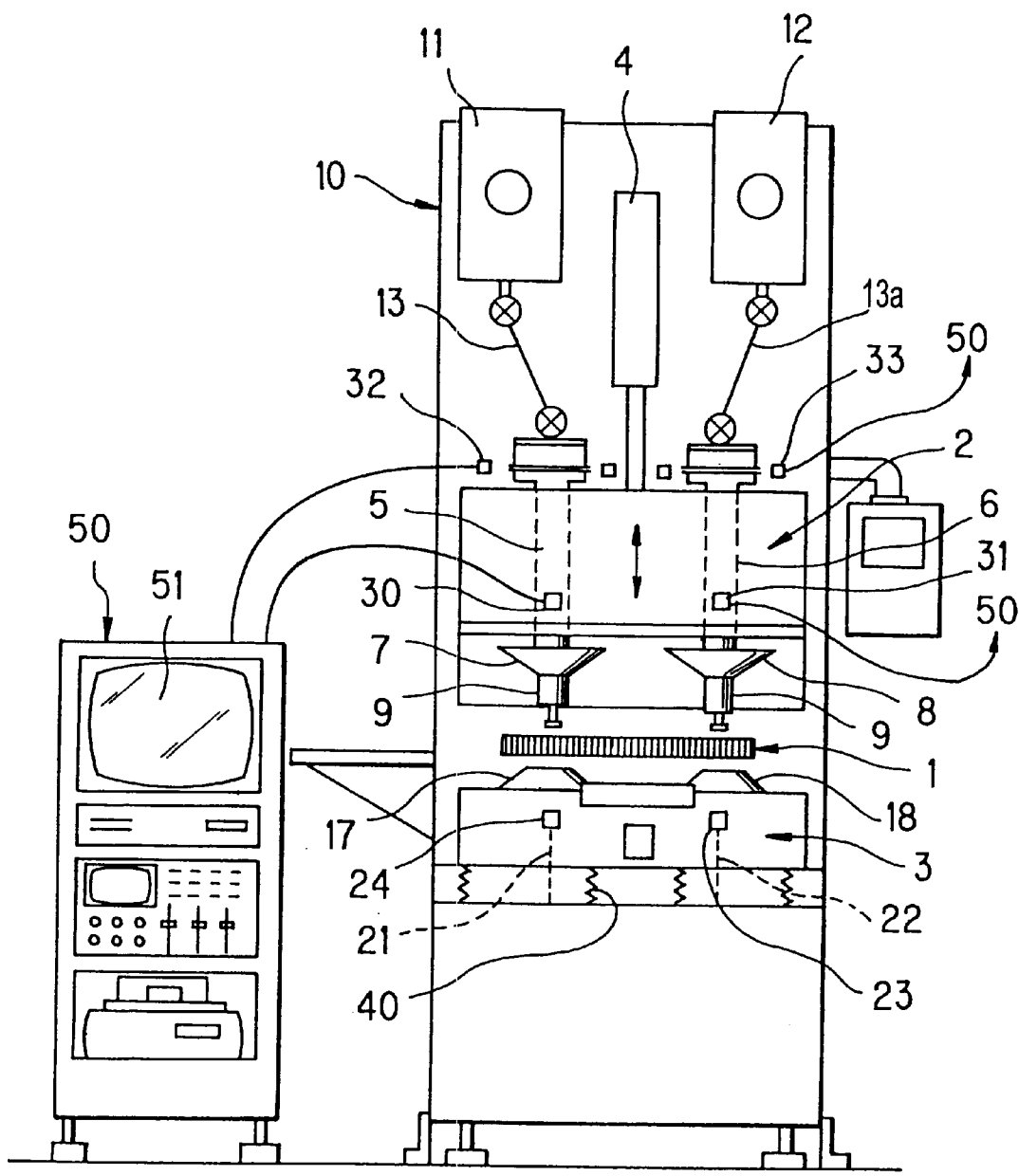
FIG. 1 is a front view of a noise tester according to this invention.
Figure 2:
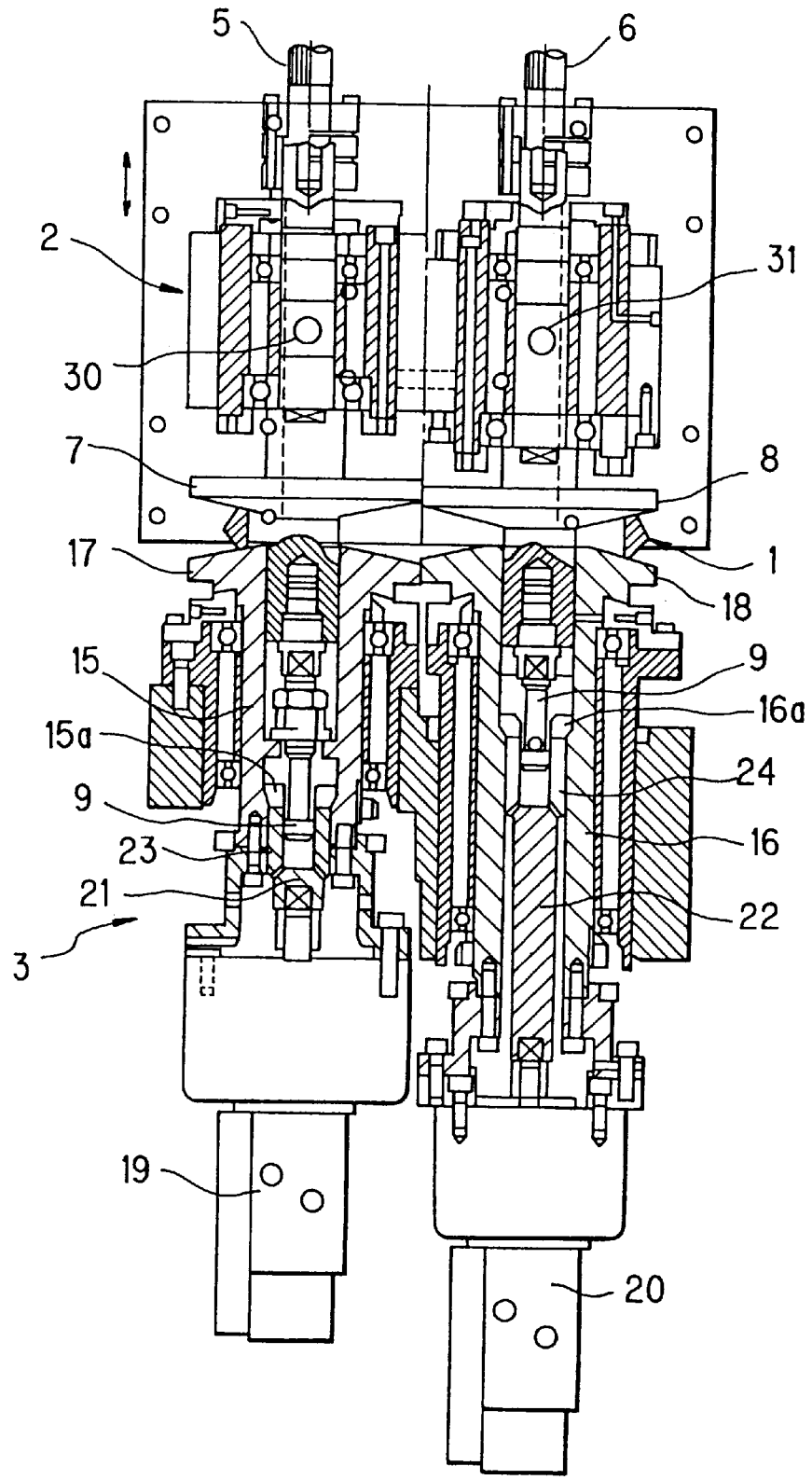
FIG. 2 is a cross-sectional view of the noise tester.

Referring to FIG. 1–FIG. 2 of the drawings, a noise tester for a V-belt 1 comprises a main body 10 and a controller 50.

The main body 10 comprises an upper unit 2 and lower unit 3. The upper unit 2 can ascend or descend in a vertical direction. The lower unit 3 is supported on the main body 10 via an antivibration mount 40 at a position facing the upper unit 2.

A first movable conical plate 7 and second movable conical plate 8 are supported free to rotate in the upper unit 2 via shafts 5 and 6. A first fixed conical plate 17 and second fixed conical plate 18 are supported free to rotate in the lower unit 3.

When the upper unit 2 ascends, the movable conical plates 7, 8 separate from the fixed conical plates 17, 18. On the other hand, when the upper unit 2 descends, the movable conical plates 7, 8 approach the fixed conical plates 17, 18, and the V-belt 1 is gripped in a V-shaped groove formed between the movable conical plates 7, 8, and fixed conical plates 17, 18. The combination of the first movable conical plate 7 and first fixed conical plate 17, and the combination of the second movable conical plate 8 and second fixed conical plate 18, correspond respectively to a drive pulley and a driven pulley of a belt type CVT.

The upper unit 2 is supported by a guide mechanism installed in the main body 10, e.g. a linear motion guide, and it can ascend or descend in a vertical direction. The upper unit 2 is driven by a lifting actuator 4 installed in the main body 10.

The first movable conical plate 7 and second movable conical plate 8 are fitted to the shafts 5, 6 so that the conical surfaces face downwards. The shafts 5, 6 are supported free to rotate via bearings in the upper unit 2.

The upper end of the shaft 5 is connected to a drive motor 11 via a constant-velocity universal joint 13a. The upper end of the shaft 6 is connected to a load motor 12 via a constant-velocity universal joint 13b.

The drive motor 11 rotates the shaft 5 and drives the V-belt 1. The load motor 12 applies a load to the shaft 6. The load corresponds to the load received by a vehicle in actual running. As the motors 11, 12, and shafts 5, 6 are connected by the constant-velocity universal joints 13a, 13b which can extend and contract in an axial direction, the first movable conical plate 7 can be driven at a predetermined rotation speed even when the upper unit 2 has descended.

Figure 3:
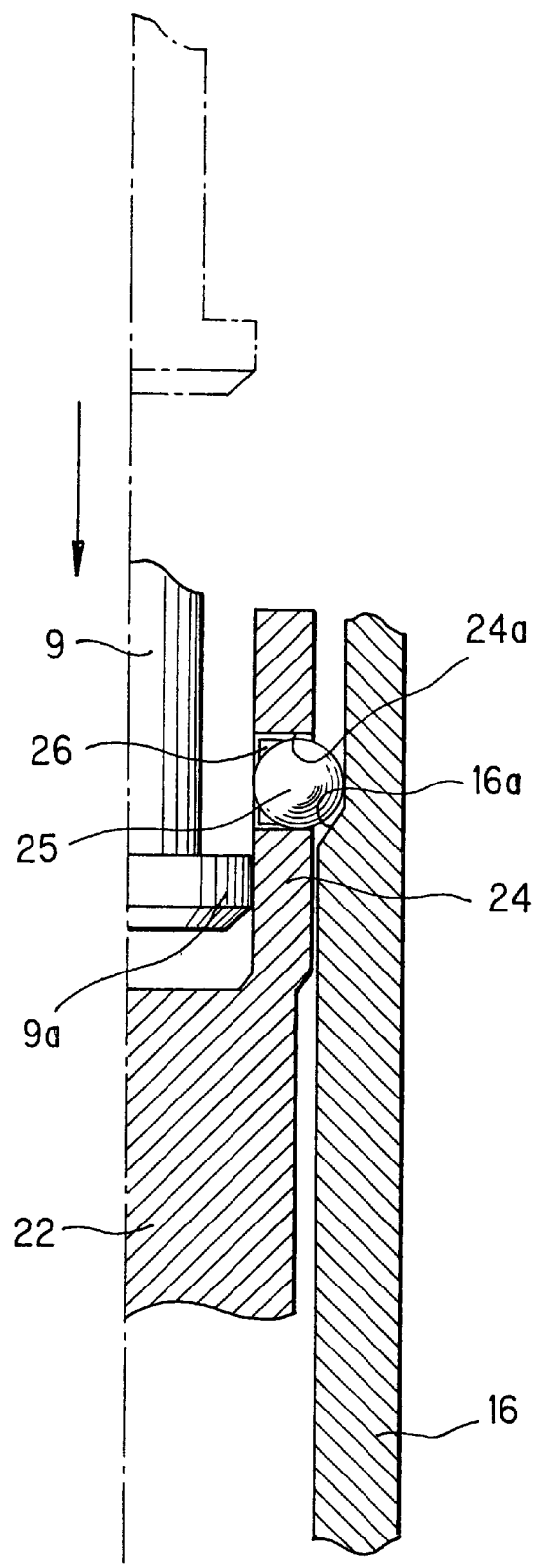
FIG. 3 is a cross-sectional view showing the state of an engaging part before a clamp shaft is drawn down.

Drawbars 9, 9 are installed at the base ends of the shafts 5, 6. The drawbars 9, 9 project by a predetermined amount from the movable conical plates 7, 8 towards the fixed conical plates 17, 18. Flanges 9a which hook on to clamp pieces 23, 24 of the lower unit 3 after the upper unit 2 descends, are provided at the lower ends of the drawbars 9, 9 as shown in FIG. 3.

Rotation sensors 32, 33 which detect a rotation speed are installed at the upper ends of the shafts 5, 6. Vibration sensors 30, 31 which detect the vibration of the V-belt 1 transmitted via the movable conical plates 7, 8, are installed on bearings, not shown, which support the middle parts of the shafts 5, 6. The outputs of these sensors 30–33 are input to the controller 50. The vibration sensors 30, 31 comprise, for example, acceleration sensors.

Hollow shafts 15, 16 are installed in a vertical direction, and are supported free to rotate in the lower unit 3 as shown in FIG. 2. The first fixed conical plate 17 and second fixed conical plate 18 installed in the lower unit 3 are attached to the hollow shafts 15, 16 with their conical surfaces facing upwards. The base ends of the hollow shafts 15, 16 are joined to rotary actuators 19, 20.

Clamp shafts 21, 22 provided with clamp pieces 23, 24 are housed free to displace in an axial direction inside the hollow shafts 15, 16. When the drawbars 9, 9 are joined to the clamp pieces 23, 24 and are drawn downwards, the V-belt 1 is gripped with a predetermined pressure between the fixed conical plates 17, 18 and the movable conical plates 7, 8.

The base ends of the clamp shafts 21, 22 are joined to the rotary actuators 19, 20. When the rotary actuators 19,20 extend and contract, the clamp shafts 21, 22 ascend or descend in the axial direction.

The casings of the rotary actuators 19, 20 are supported in the lower unit 3 via brackets, not shown. The hollow shafts 15, 16, and the clamp shafts 21, 22 are joined with the rotary actuators 19, 20 so that they rotate together. The rotary actuators 19, 20 draw in the clamp shafts 21, 22 and rotate together with the fixed conical plates 17, 18 while pressure is applied to the V-belt 1 and V-belt 1 is rotated.

Figure 4:
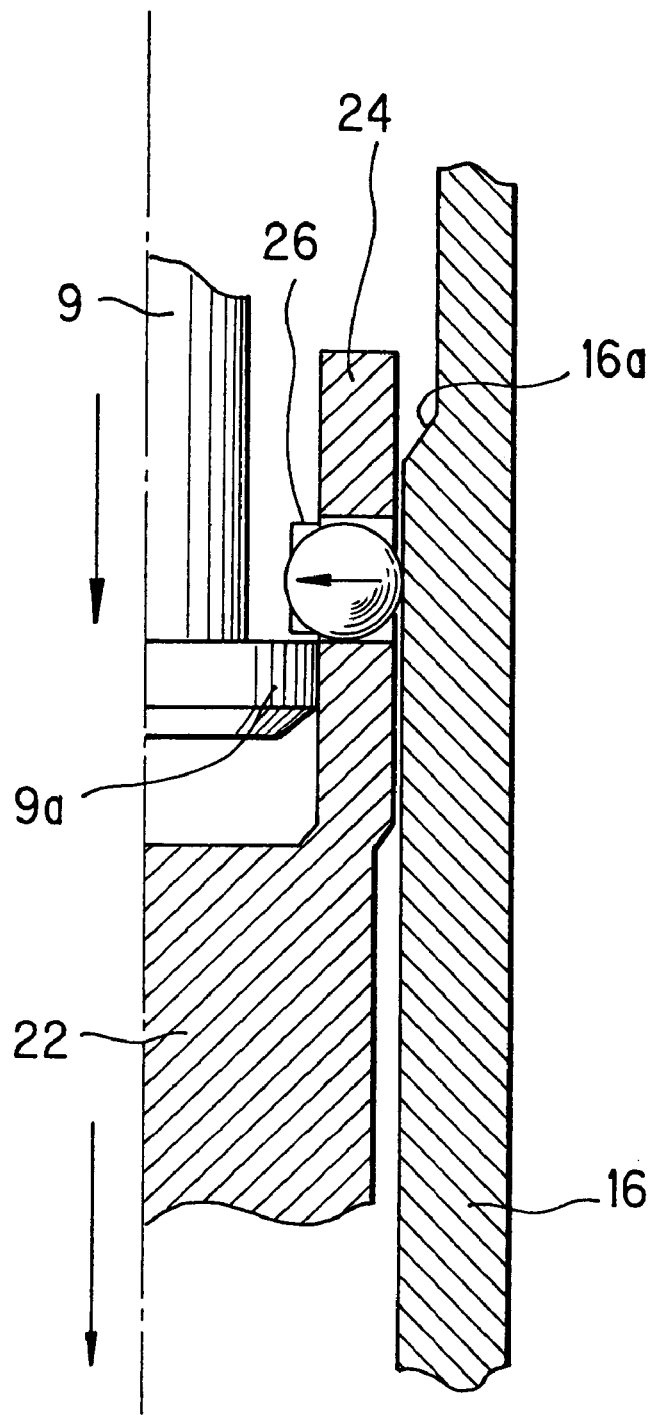
FIG. 4 is similar to FIG. 3, but showing the state of the engaging part after the clamp shaft is drawn down.

The clamp piece 24 is cylindrical as shown in FIGS. 3 and 4, and is formed at the upper end of the clamp shaft 22 which is joined to the rotary actuator 20. The outer circumference of the clamp piece 24 slides on the inner circumference of the hollow shaft 16, and the inner circumference of the clamp piece 24 slides on the outer circumference of the flange 9a of the drawbar 9.

Retaining holes 24a are formed approximately midway in the axial direction of the clamp piece 24, and balls 25 which are free to displace in the radial direction of the clamp piece 24 are held inside the retaining holes 24a. The balls 25 are pushed towards the hollow shaft 16 by retainers 26, and the balls 25 are displaced in a radial direction to an extent depending on the inner diameter of the hollow shaft 16.

From its upper end to a tapering part 16a, the hollow shaft 16 has an inner diameter larger than the outer diameter of the clamp piece 24, and below the tapering part 16a, it has an inner circumference which slides on the outer circumference of the clamp piece 24.

Therefore, as shown in FIG. 3, when the clamp piece 24 is put on standby in a position where the rotary actuator 20 is extended, the balls 25 are situated above the tapering part 16a and remain held inside the retaining holes 24a, so they do not extend inside the clamp piece 24.

In such a condition, when the lifting actuator 4 is extended and the upper unit 2 descends, the drawbar 9 of the shaft 6 which supports the second movable conical plate 8 is inserted in the hollow shaft 16. The flange 9a of the drawbar 9 slides on the clamp piece 24 and descends to a position below the tapering part 16a. The V-belt 1 which is mounted on the first fixed conical plate 17 and second fixed conical plate 18 is then in contact with the first movable conical plate 7 and second movable conical plate 8.

When the rotary actuator 20 contracts, the clamp piece 24 descends together with the clamp shaft 22. As the balls 25 are held in the retaining holes 24a, they also descend together with the clamp shaft 22, reaching a position lower than the tapering part 16a. Consequently, they push the retainers 26 inwards and extend into the clamp piece 24 as shown in FIG. 4.

As a result, as the flange 9a of the drawbar 9 is hooked on to the clamp piece 24 by the balls 25, when the clamp shaft 22 moves farther down the drawbar 9 is drawn downwards, the second movable conical plate 8 is pressed against the second fixed conical plate 18, and the V-belt 1 is gripped.

On the other hand, to disengage the drawbar 9 and clamp piece 24, the rotary actuator 20 is extended, and the clamp piece 24 is raised to the position shown in FIG. 3. The balls are then pushed back by the retainers 26, so when the lifting actuator 4 is retracted, the drawbar 9 is released from the clamp piece 24, the upper unit 2 separates from the lower unit 3, and the conical plates separate.

A clamp piece 23 and rotary actuator 19 of the first fixed conical plate 17 has an identical construction. That is, the drawbar 9 and clamp piece 23 are joined or released according to the axial position of the clamp piece 23 relative to a tapering part 15a of the hollow shaft 15.

Figure 7:
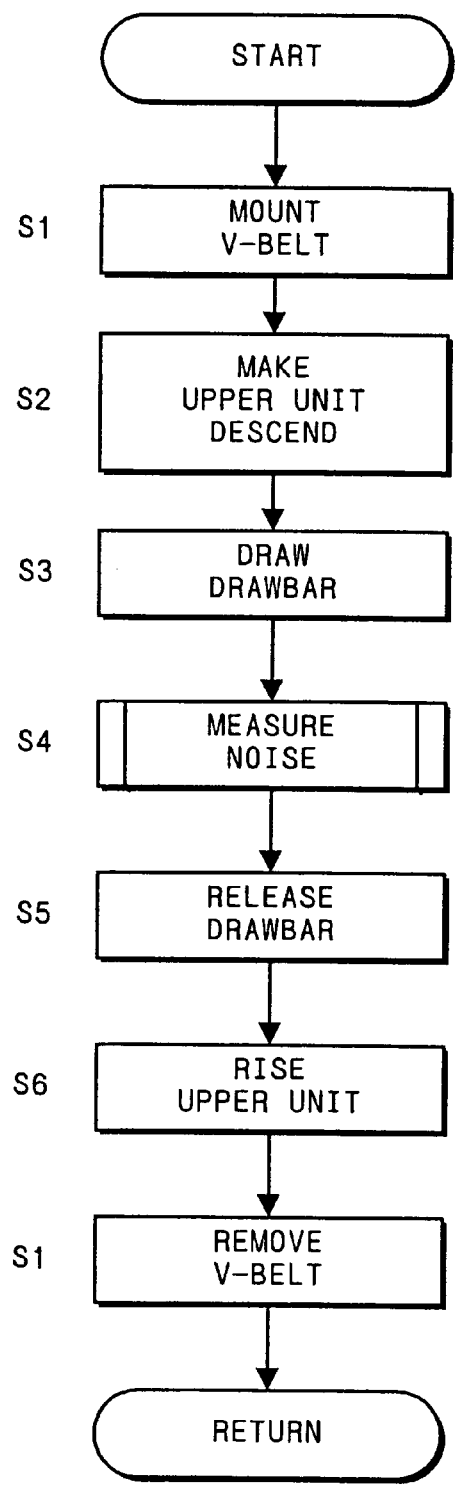
FIG. 7 is a flowchart showing a noise test process performed by a controller of the noise tester.

FIG. 7 is a flowchart showing a noise test process performed by the controller 50.

Figure 5:
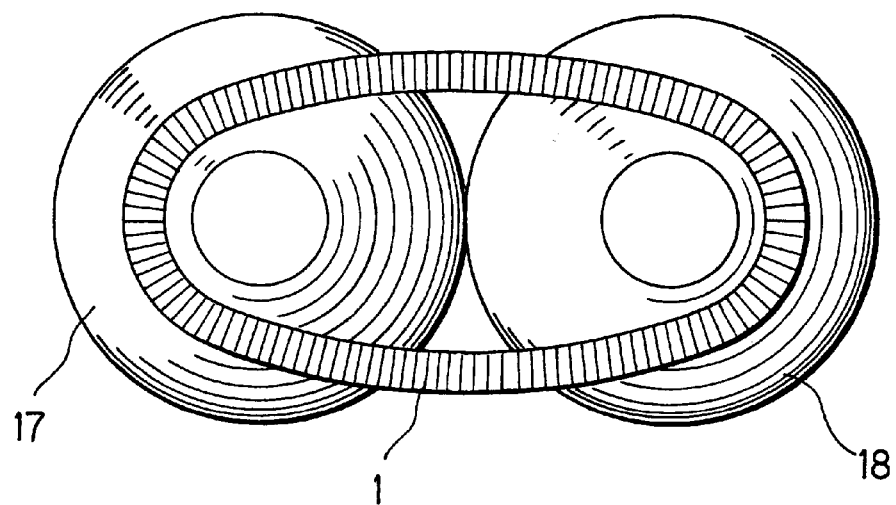
FIG. 5 is a plan view of a lower unit in which a V-belt is set.
Figure 6:
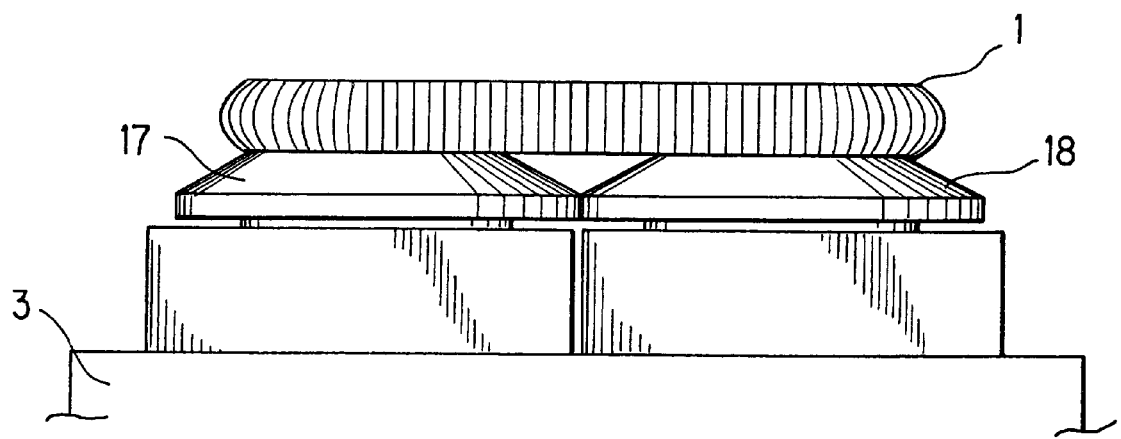
FIG. 6 is a front view of the lower unit in which the V-belt is set.

First, in a step S1, the V-belt 1 is mounted on the fixed conical plates 17, 18, as shown in FIG. 5 and FIG. 6 when the movable conical plates 7, 8 are separated from the fixed conical plates 17,18 and the rotary actuator 19, 20 are extended.

In a step S2, the lifting actuator 4 is extended so that the upper unit 2 descends, and the drawbars 9, 9 are inserted in the clamp pieces 23, 24.

In a step S3, the clamp shafts 21, 22 are drawn drown by the rotary actuators 19, 20, the drawbars 9, 9 are joined to the clamp pieces 23, 24, and the shafts 5, 6 of the upper unit 2 are thereby also drawn down. As a result, the V-belt 1 is gripped with a predetermined pressure between the movable conical plates 7, 8, and the fixed conical plates 17, 18.

In a step S4, the V-belt 1 is rotated by the drive motor 11 in the same state as when it was assembled in the continuously variable transmission. The noise is measured as described later.

In a step S5, the rotary actuators 19, 20 are extended, and the drawbars 9, 9 are released from the clamping pieces 23, 24.

In a step S6, the upper unit 2 is raised, and the movable conical plates 7, 8 are separated from the fixed conical plates 17, 18 of the lower unit 3.

In a step S7, the V-belt 1 is removed, and the noise test is terminated.

Figure 8:
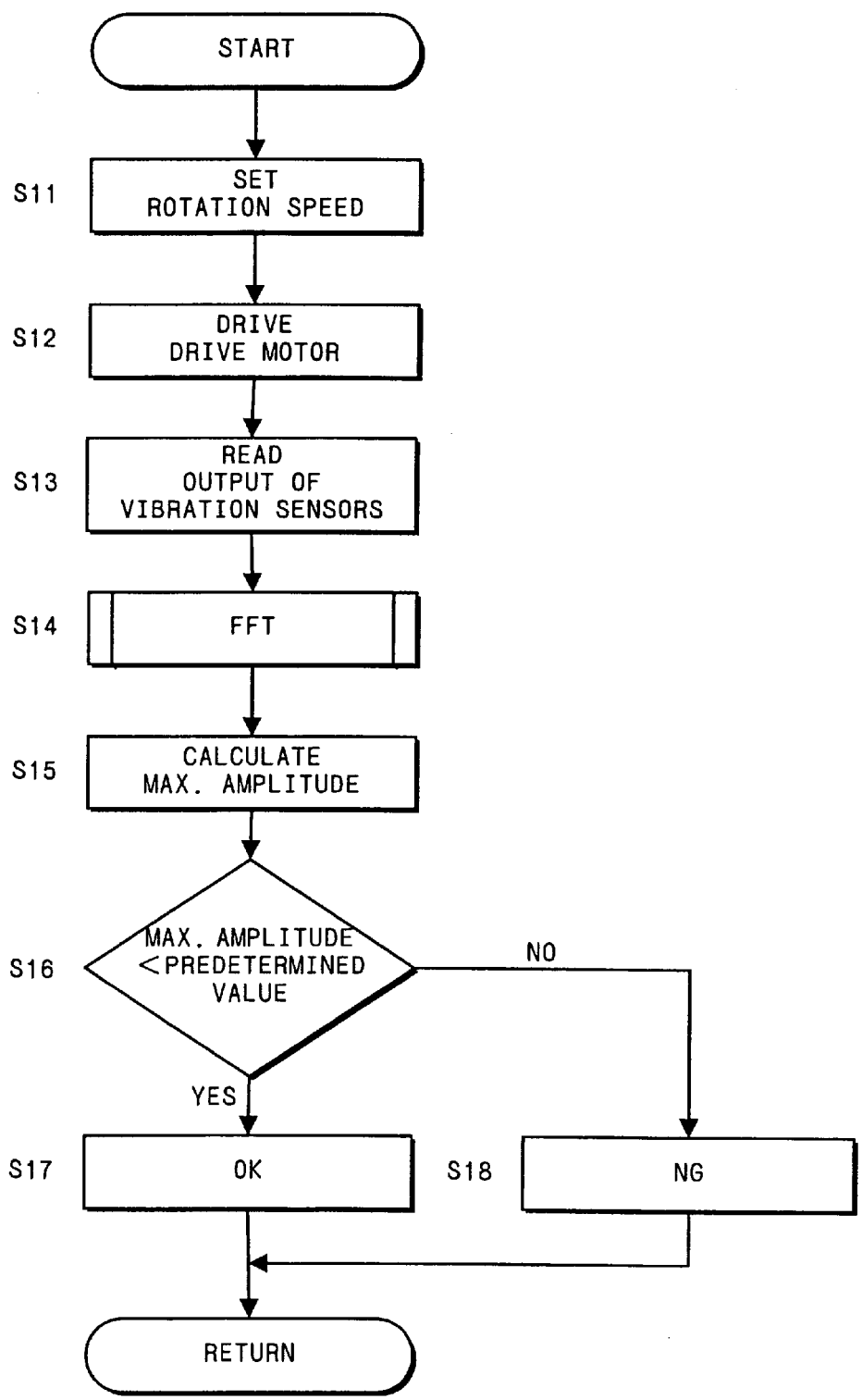
FIG. 8 is a flowchart showing a noise measurement process performed by the controller.

FIG. 8 is a flowchart showing the noise measurement process performed in the step S4.

In a step S11, the rotation speed of the drive motor 11 which drives the first movable conical plate 7 and fixed conical plate 17 is set. The rotation speed is set so that it corresponds to the vehicle coasting speed at which the noise of the continuously variable transmission is most annoying for the driver. For example, it is set to 590–620 rpm which corresponds to the rotation speed when the vehicle is coasting at 50–60 km/hr. The rotation speed of the drive motor 11 is varied in proportion to a drive ratio of the continuously variable transmission or in combination with a final gear deceleration ratio.

In a step S12, the drive motor 11 is driven to rotate the first movable conical plate 7 and first fixed conical plate 17, and the V-belt 1 is driven. At this time, the load motor 12 supplies a load corresponding to the actual load when the vehicle is running via the second movable conical plate and fixed conical plates 8, 18.

In a step S13, the outputs of vibration sensors 30, 31 which detect the vibration of the shafts 5, 6 of the first movable conical plate 7 and second movable conical plate 8 are read.

In a step S14, a frequency analysis is performed by FFT (Fast Fourier Transformation).

In a step S15, the maximum amplitude is calculated from the frequency analysis result.

In a step S16, it is determined whether or not the maximum amplitude is smaller than a predetermined value. When the maximum amplitude is less than the predetermined value, the V-belt 1 deemed to be satisfactory, the routine proceeds to a step S17, and "OK" is displayed by a display unit 51 of the controller 50. On the other hand, when the maximum amplitude is larger than the predetermined value, the V-belt 1 deemed to be unsatisfactory, the routine proceeds to a step S18, and "NG" is displayed by the display unit 51 of the controller 50.

The processing from the above-mentioned step S11 to the step S18 is repeated at a plural number of rotation speeds within the above rotation speed range of 590–620 rpm of the drive motor 11, and if the noise at all rotation speeds is less than the predetermined value, the V-belt 1 is determined to be satisfactory. For example, a satisfactory result is obtained if the maximum amplitude measured at each of the four rotation speeds 590, 600, 610 and 620 rpm is less than the predetermined value.

In this embodiment, a satisfactory or unsatisfactory results are obtained based on the vibration of the shafts 5, 6. However, the noise emitted by the V-belt 1 can be measured directly, and satisfactory or unsatisfactory results may be obtained based on the detected noise.

The movable conical plate can be moved close to or moved away from the fixed conical plate automatically by the extension and contraction of the lifting actuator 4, and the extension and contraction of the rotary actuators 19, 20. A worker need only mount the V-belt 1 on the lower unit 3, so much less time and labor is required than in the case of the prior art tester, and total inspection of the V-belts can be performed.

The determination of noise is only performed in a rotation speed region corresponding to coasting when the noise of the continuously variable transmission is a nuisance, so the noise need not be determined in all driving regions, and the time required for the determination can be reduced.

In addition, the noise examination of the V-belt 1 was not performed throughout the whole rotation speed range when the vehicle was coasting, but only at predetermined rotation speeds, hence the determination time is greatly shortened compared with the case when the determination is performed in all driving regions.

Further, in the aforesaid embodiment, the rotary actuators 19, 20 were provided for gripping the V-belt 1, and the lifting actuator 4 was provided for bringing the movable conical plate closer to the fixed conical plate and for separating them. However, the rotary actuators 19, 20 can be omitted so that only the lifting actuator 4 is provided. In this case, the movable conical plate and fixed conical plate can be moved close together to grip the V-belt 1 or separated to release the V-belt 1 by the lifting actuator 4 alone.

The contents of Japanese Application No. 9-341332, with a filing date Dec. 11, 1997, are hereby incorporated by reference.

The embodiments of this invention in which an exclusive property or privilege is claimed are defined as follows:

What is claimed:

1. A noise tester of a V-belt used in a continuously variable transmission, comprising:

a lower unit, a first fixed conical plate and a second fixed conical plate supported free to rotate in said lower unit, an upper unit which displaces in a vertical direction above said lower unit, an actuator for displacing said upper unit in a vertical direction, a first movable conical plate which is supported free to rotate in said upper unit via a first shaft and displace in a vertical direction, a second movable conical plate which is supported free to rotate in said upper unit via a second shaft and displace in a vertical direction, a motor for rotating either of said shafts, a sensor for measuring either the vibration of either of said shafts or the noise of said V-belt, and a controller for determining whether or not said V-belt is satisfactory based on said measured vibration or noise.

2. A device as defined in claim 1, wherein said motor rotates either of said shafts at a rotation speed corresponding to a rotation speed when a vehicle is coasting.

3. A device as defined in claim 1, wherein said controller determines that said V-belt is satisfactory when the vibration or noise measured by said sensor is less than a predetermined value.

4. A method of testing noise of a V-belt used in a continuously variable transmission, comprising:

measuring either the vibration of a shaft which rotates said V-belt or the noise of said V-belt when said V-belt is driven at a rotation speed corresponding to a rotation speed when a vehicle is coasting, and determining whether or not said V-belt is satisfactory based on the measured vibration or noise.

5. The method according to claim 4, further comprising:

determining that said V-belt is satisfactory when the vibration or noise measured is less than a predetermined value.

* * * * *